United States Patent [19]

Shockovsky

[11] 4,132,002

[45] Jan. 2, 1979

[54] DIAL SETTING DEVICE

[76] Inventor: Robert E. Shockovsky, 4016 Landside Dr., Louisville, Ky. 40220

[21] Appl. No.: 756,121

[22] Filed: Jan. 3, 1977

[51] Int. Cl.[2] .................... G01B 5/00

[52] U.S. Cl. .................... 33/180 R; 33/174 G; 74/10.45

[58] Field of Search .................... 33/174 G, 180 R, 181 R; 74/813 C, 815, 816, 10.2, 10.45, 10.7; 116/129 N, 133

[56] References Cited

U.S. PATENT DOCUMENTS

| | | | |
|---|---|---|---|
| 2,649,157 | 8/1953 | Weisbeck | 33/174 G |
| 3,193,942 | 7/1965 | Cates | 33/180 R |
| 3,295,218 | 1/1967 | Chenowith | 33/174 G |
| 3,402,692 | 9/1968 | Hickman et al. | 116/115 |

FOREIGN PATENT DOCUMENTS

| | | | |
|---|---|---|---|
| 116428 | 6/1918 | United Kingdom | 33/180 R |

*Primary Examiner*—Richard R. Stearns
*Attorney, Agent, or Firm*—Price and Caslin

[57] ABSTRACT

A device for establishing dial settings for a plurality of control shafts in a close group for use with electrical apparatus, involves a secondary stop assembly, which may be in the form of a single preset plate or template or in the form of a sophisticated assembly containing multiple plates and rotatable secondary stops. Further, a shaft driving device is disclosed which involves the use of a slip clutch, which will turn each of the shafts until a positive resistance is reached, and then the clutch will slip so as to establish a dial setting for each shaft at a desired point. The device is used in conjunction with control shaft groups in which each of the control shafts is equipped with a shaft stop in the form of a collar fitted onto the shaft and having a radially projecting lug acting as the shaft stop.

28 Claims, 11 Drawing Figures

DIAL SETTING DEVICE

FIELD OF THE INVENTION

This invention relates to new and useful improvements in stops or preset selector mechanisms for dial indicators and has for an object a simple and inexpensive mechanism that may be readily applied to different forms of electrically controlled shaft groups. In today's technology, machines are equipped with a plurality of extensive control shafts that are arranged in a close group, and in many instances it is necessary to transfer a set of dial settings for the shafts of one machine to the dials or shifts of an identical machine in another location. Since the setting of the dials can be quite intricate and time consuming, it is desirable to provide a dial setting mechanism whereby the dials can be preset and the settings transferred to another control shaft group with a minimum of time and labor.

BACKGROUND OF THE INVENTION

In today's technology, more and more electronic and electrical equipment is equipped with a plurality of control shafts arranged in a close group. In many instances, it is necessary to preset a particular group of dial settings and transfer it to another machine. In other instances, it is necessary to establish a group of settings which has to be interchanged with a second or third group of settings, which three occupy 95 percent of the machines time. Consequently, it is desirable to provide a dial setting device which will eliminate or minimize the time and labor involved in changing settings on one machine or or transferring the settings of one machine to another.

According to the prior art, Ost, in U.S. Pat. Nos. 2,240,522, Herbst, in 2,401,357 and Egger, in 3,916,721, disclosed mechanisms for setting stops on indicating dials. Riebe, in U.S. Pat. No. 2,434,369, discloses a friction clutch and a detent mechanism on the indicator drive to orient the driving member relative to the indicating members. Hickman discloses a device for transferring dial settings in U.S. Pat. No. 3,402,692 and utilizes a turn counter and stop mechanism. Twee, in U.S. Pat. No. 3,302,693, discloses a C-shaped clamp utilizing a lock spring and a manual set. Orozco, in U.S. Pat. No. 3,257,870, discloses a mechanism for advancing a shaft exactly to a desired angular position. Insofar, however, as applicant is aware, there has not been disclosed a mechanism whereby a complete set of dial settings can be easily and quickly taken from a group of control shafts, or in which a preset group of dial settings can be quickly transferred to a control shaft group to set the entire group in a desired configuration.

SUMMARY OF THE INVENTION

According to this invention, there is provided a secondary stop assembly, which in its simplest form is in the form of a template containing a series of annular openings, in each of the annular openings is a medially projecting lug or stop in a desired angular dial setting. This template can then be set over a control shaft group, and each of the dials or shafts in the group can be set so that the radially projecting stop or lug of the shaft stop is brought into physical contact with the medially projecting lug of the secondary stop assembly to establish a correct dial or shaft setting. In another modification, a drive housing can be utilized and which is equipped with an adjustable slip for each shaft, so that the entire group of control shafts can be turned from its zero position until it is brought into contact with the medially projecting lugs of the secondary stop assembly. The slip clutch is designed so that it will positively turn the control shafts in either direction but will slip when a resisting force such as the medially projecting lug is encountered. Thus, as each projecting lug of the shaft stop comes into contact with the medially projecting lug or stop of the secondary stop assembly, the respective shaft is stopped in position while other shafts continue to turn to their desired settings. In another modification, there is developed an adjustable template or secondary stop assembly in which the secondary stops are rotatable collars, each with a limit stop, a zero return spring and a driving means so that each of the adjustable stops can be set to their limit position and return due to the biasing pressure of their zero return springs to engagement with the shaft settings of a particular control group. Thereafter, the shafts are locked into position and the secondary stop assembly can be removed and used as an adjustable template for setting a group of control shafts as previously disclosed.

BRIEF DESCRIPTION OF THE DRAWINGS

This invention will be better understood by reference to the accompanying drawings, in which.

This configuration can also be used as a manually adjustable secondary stop assembly.

DETAILED DESCRIPTION OF A PREFERRED EMBODIMENT

Figure 1:
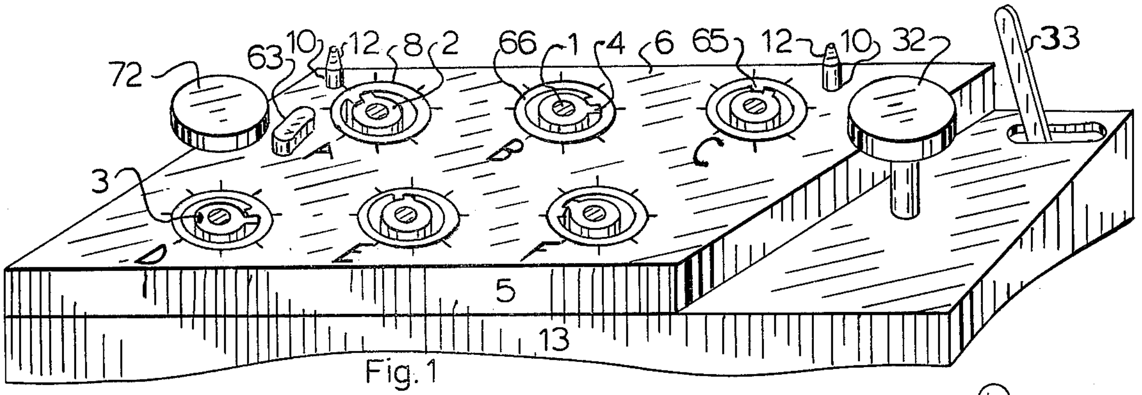
FIG. 1 is a view, in particular, illustrating the secondary stop assembly in position on the drive housing.

As previously indicated, this invention is designed for use with a group of control shafts such as shafts A, B, C, D, E, and F, illustrated in FIG. 1. In this figure, each of the control shafts 1 are equipped with its own shaft stop member 2 comprising an annular collar 3 and a radially projecting stop or lug 4. As is shown in FIG. 1, each of the shaft stop members and each of the shafts 1 are at a different angular position in contact with the medially projecting lugs 65 of the secondary in the from of rotatable collars 66.

The medially projecting lug 65 of the rotatable collar 66 forms the secondary stop means. The secondary stop assembly is denoted generally as 5, whereas the drive housing for the shaft group is designated generally by numeral 13. It will also be noted that the dial plate 6 and each of the other plates are equipped with a positioning opening 10 for fitting over the positioning post 12.

Referring now to the drive housing 13, each of the control shafts 1 is surrounded by its own slip clutch 16, which is adjustable by means of a clutch nut 17, which forces the biasing pressure of the spring against the clutch facing 18. The clutch facing 18 is held into position by means of a collar member 20 which is anchored to the shaft by means of set screw 19. In a preferred embodiment, each of the shafts is turned by means of a manual drive gear 26 which is turned by means of a driving knob 32 and is intermeshed with idler gears 23 and 23*a*, which in turn intermesh with the driven gears 31 and 42. Driven gears 31 and 42 drive idler gears 22 and 24. The idler gears 22 and 24 on the other hand transmit the motion from driven gears 31 and 42 to driven gears 27 and 28. Gears 27 and 28 engage idler gears 21 and 25 which in turn drive gears 29 and 30.

Figure 2:
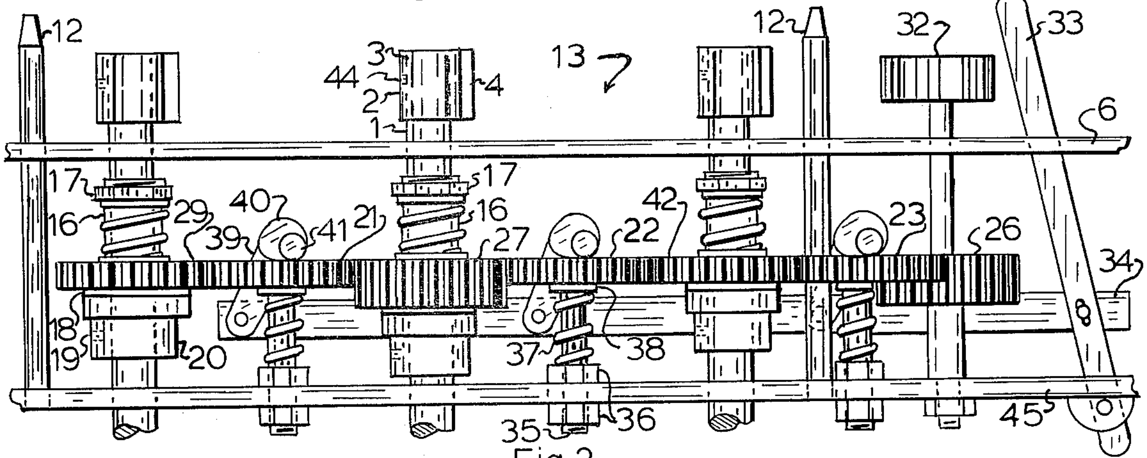
FIG. 2 is a side elevation (with parts broken away for ease of illustration) of the shift drive mechanism of this device, showing in particular the clutch release members.
Figure 3:
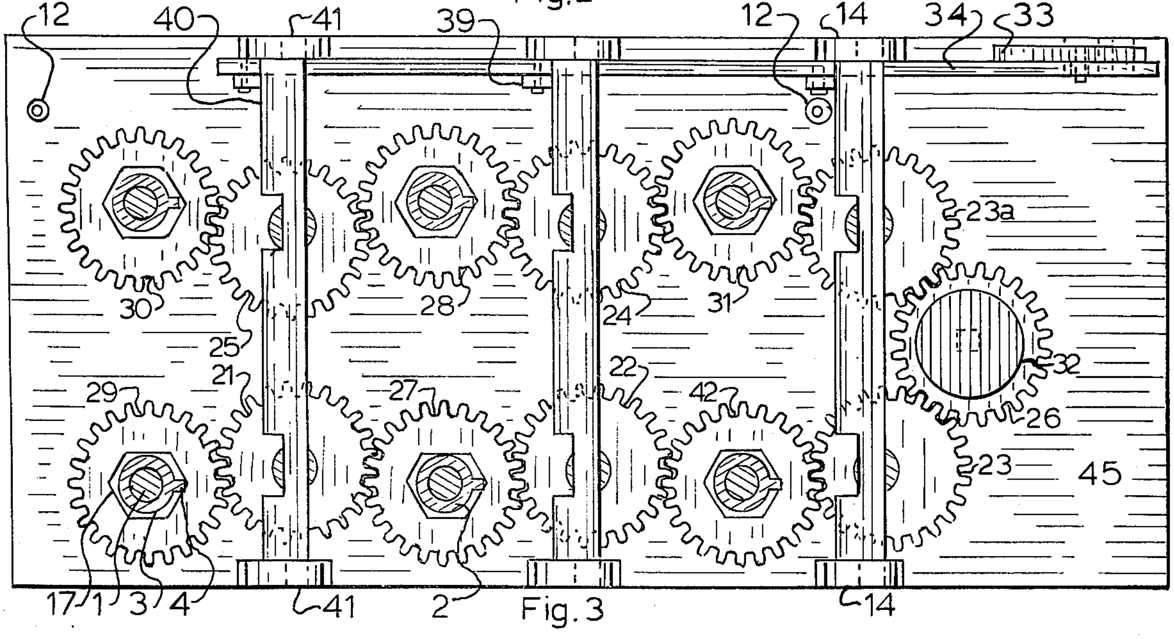
FIG. 3 is a plan view illustrating one form of the shaft drive assembly (the first modification of a dial plate not being shown for simplicity and clarity of illustration).

As is shown in some detail in FIG. 2, the idler gears are each provided with a collar 38 that is slidably positioned over shaft 35 which is anchored by nuts 36 to the bearing plate 45. The collar 38 is held into position by the biasing pressure of compression spring 37. Positioned above the idler gears 21, 22 and 23, is a clutch release in the form of an eccentric cam 40, eccentrically mounted on shaft 41 which is turned by a cam actuating arm 39 pivotably attached to a tie rod 34 which is powered by means of clutch release arm 33. Thus, as the clutch release arm is pulled backwardly, the cam actuating arm 39 pulls the eccentrically mounted cam 40 into position so that the tip depresses its respective idler gear against the biasing pressure of the spring 37. It should be noted that gears 26, 27, and 29 do not disengage when idlers 21, 22, 23, 24 and 24 are depressed to disengage from gears 29, 30, 31, 42.

The adjustment of the slip clutches are such that the shaft stops 2 can be driven positively in either direction but will slip when the radially extending lug 4 comes into engagement with the medially extending lug 65 of the secondary stop assembly.

In the most basic form of this invention, the secondary stop assembly can take the place of a single secondary stop plate 7 in the form of a template having preset lugs 65*a* projecting medially from the annular openings 8 punched so as to register with the various control shafts 1. Again, the positioning holes 10 are set to correctly position the assembly over the control shaft group. If this plate is used by itself, the shaft stop members can be turned individually so that the projecting stops 4 engage with the medially projecting lug 65*a* for the proper setting. However, for more sophisticated work, the secondary stop plate 7 can be used in conjunction with the drive housing 13, as illustrated, so that the entire set of shafts can be simultaneously moved from their zero position until the lugs 4 come into engagement with the medially projecting lugs 65*a*. When the shafts are properly set, the secondary stop asembly in the form of secondary stop plate 7 can be removed.

Figure 5:
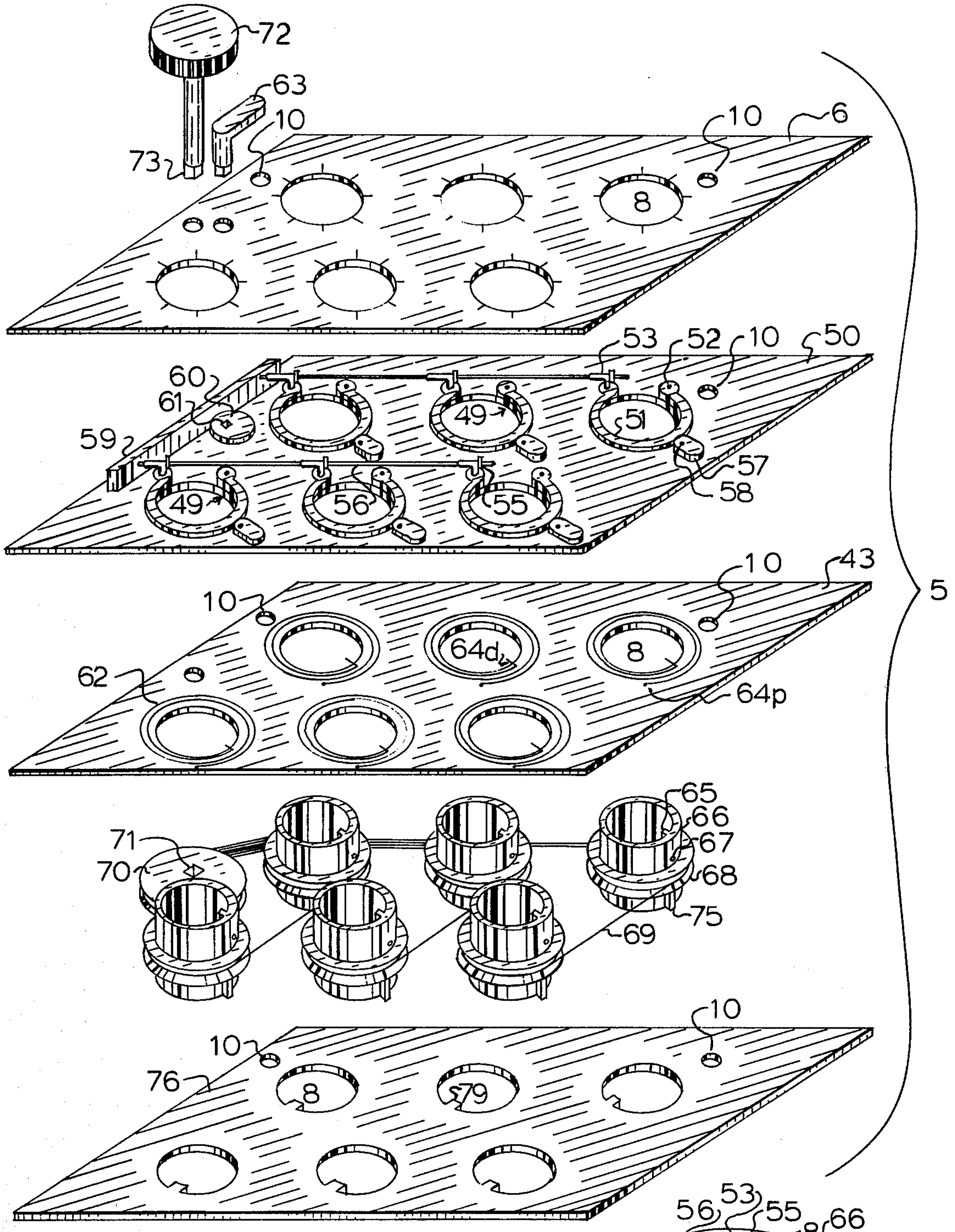
FIG. 5 is an exploded view, in perspective, of a second modification showing a more sophisticated secondary stop assembly comprising a plurality of plates and a plurality of rotatable collars serving as adjustable secondary stop members journaled in the plates, (again with the spacers and assembly fasteners not shown for clarity and ease of illustration).

However, the invention contemplates a much more sophisticated and complicated secondary stop assembly 5 as is shown in FIG. 5, in which the secondary stop members are in the form of rotatable collars 66, each having a medially projecting lug 65 and each having a spool 68 for the drive cables 69 so that the limit driver spool 70 can drive each of the spools into a desired position. Referring now to the drawing, it will be noted that the assembly 5 is made up of a plurality of superimposed plates including a dial plate 6, the lock plate 50, the zero return plate or template 43 and the limit plate 76. The secondary stop members in the form of rotatable collars 66 are journaled within the annular openings 8 forming the stop assembly and are capable of being driven by means of each individual cable 69 contained on the limit driving spool 70 which is driven by the manual limit driver 72 containing a square end 73, which fits the square socket 71 of the limit driver spool 70.

Each of the rotatable collars contain a radially projecting limit stop 75 adapted to fit with the limit stop 79 of the limit plate or template 76. Thus, the rotatable collars can turned until the limit stop 75 comes into engagement with the limit stop 79. Further, each of the rotatable collars contain an insertion opening 67 for insertion of a zero return spring 62 surrounding each of the annular openings in the zero return plate 43. In this plate, the proximal end 64p of the spring member 62 is anchored in the zero return plate 43 whereas the distal end 64d of the zero return spring fits into the insertion opening 67 of the rotatable collar 66. Thus, as the collars are rotated from the zero position to the limit position, upon release of the limit driver 70, or of the locks 49 on lock plate 50, each of the rotatable collars 66 will return by means of its return spring 62 to zero position or to engagement with the lug 4 of the shaft stop 2 of its respective shaft.

Figure 6:
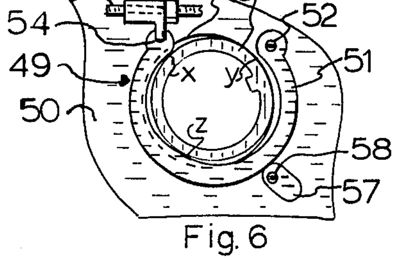
FIG. 6 is a plan view illustrating in detail the lock for the adjustable secondary stop members.

When this occurs, each of the rotatable collars can then be locked into position by operation of the lock lever 63 and each of the individual locks 49 on the lock plate 50. The detail of the lock 49 is shown in FIG. 6 and the lock 49 consists, in a preferred embodiment, of a crescent shaped lock ring 51 fixed to the lock plate 50 by anchor screw 52 at one end. The other end of the lock ring 51 is connected at pont 54 to a lock release coupling 53 which in turn is trained over a lock coupling rod 56. The lock release coupling member 53 is adjusted by means of lock adjust 55 on the threaded lock coupling rod 56. The tension of the lock ring can be adjusted by means of a lock adjust cam 57 which is secured into place by screw 58 fitted into the lock plate 50. Note that in locked position that collar 66 is held at three points, *x*, *y* and *z*. However, when pressure is applied at 54, the ring will open to the phantom lines and allow the collar 66 to rotate in the annular opening 8.

Referring back to FIG. 5, it will be seen that each of the lock coupling rods are connected to a transversely disposed tie rod 59. This is in camming relation with a lock release cam 60 containing a square socket 61 for engagement with the square end of lock lever 63. Thus, the cam member 60 can be turned by turning lock lever 63 to apply pressure on the free end 54 of the lock rings 51 so as to force said lock rings open and release the rotatable collar 66 engaged therein at points *x, y,* and *z.*

In operation, the rotatable collars 66 are turned by turning the limit driver handle 72 until the limit stop 75 comes into engagement with the limit stop 79. Then the secondary stop assembly is fit over the control shaft group from which a group of settings is to be taken. The limit driver then is released and the return springs 62 return the rotatable collars 66 in a clockwise direction until the medially disposed stops 65 come into contact with the radially disposed lugs 4 of the shaft stops 2 and the dial settings are in proper position. The locks 49 are then engaged and the shaft stop assembly can be removed for transferring the shaft settings to a second machine.

Figure 7:
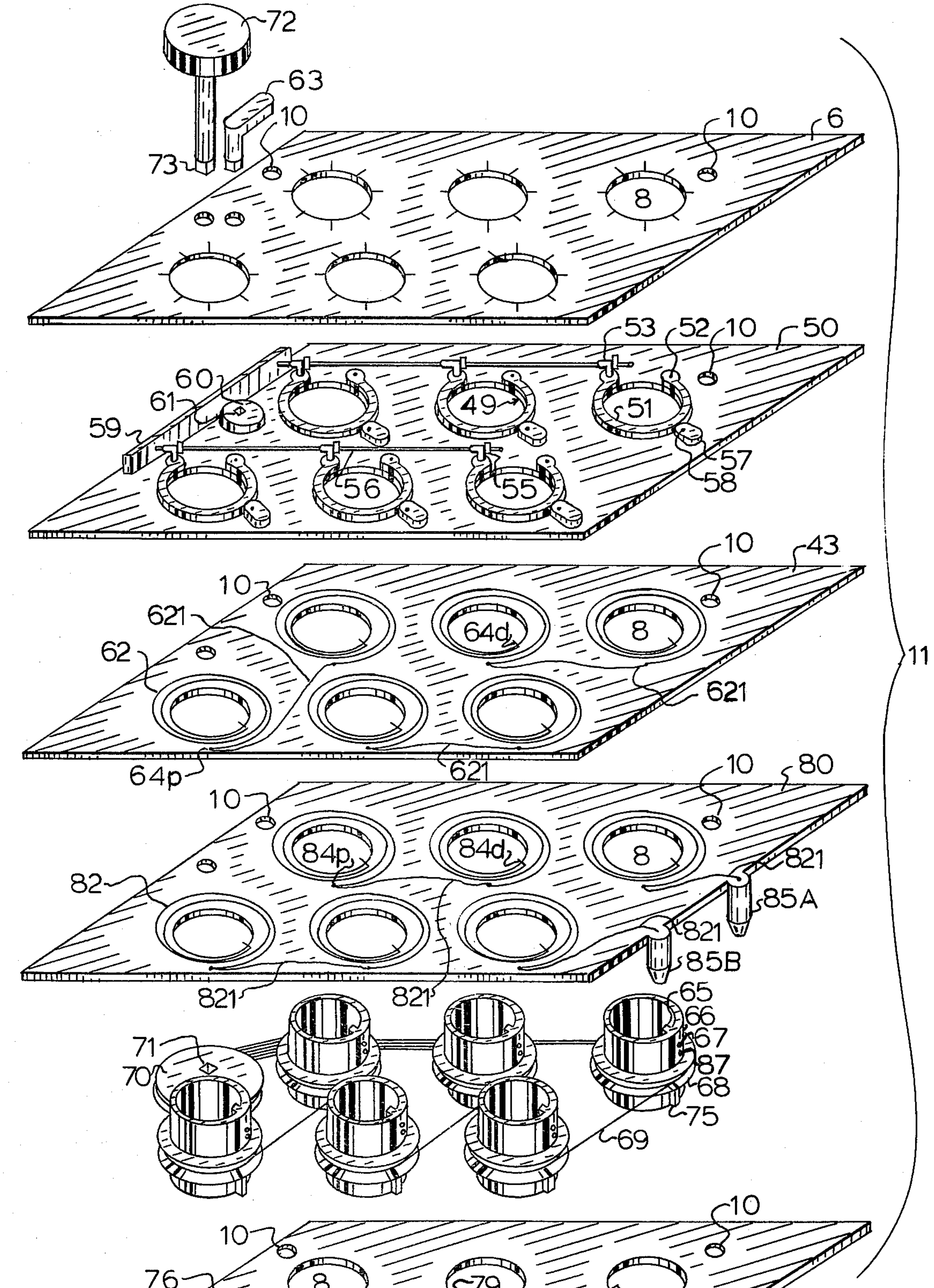
FIG. 7 is another exploded and perspective view of a third modification illustrating again the secondary stop assembly with an interlock plate to develop an electrical control circuit for the stop assembly.
Figure 8:
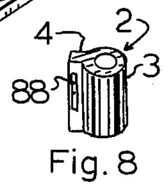
FIG. 8 is a view in perspective illustrating the shaft stop with a shorting plate for use with the electrical circuit shown in FIG. 7.
Figure 9:
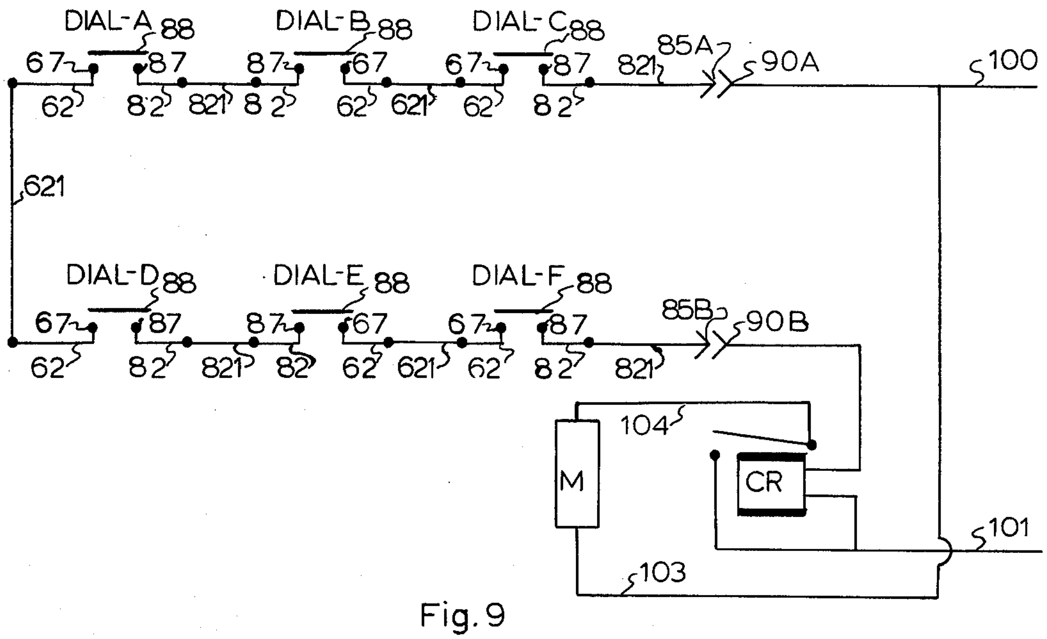
FIG. 9 is a line diagram illustrating the electrical arrangement of the electrical circuit for use with the interlock plate and assembly of the modification shown in FIG. 7.

In order to insure that the dial settings are in proper position, an electrical control circuit is disclosed in FIGS 7, 8, and 9. It will be noted in FIG. 7 that there has been introduced an interlock plate 80 containing a series of annular openings 8, each equipped with its own return spring 82. This assembly is referred to as 11. The distal end **84*d* of the spring coupling is made for insertion into an opening 87 specially provided in the rotatable collar 66, and the distal end 64*d* of the return springs 62 from the zero plate 43 again are inserted through opening 67. In this case, however the distal ends of the return springs 82 and 62, respectively, form electrical contacts on the radially projecting lugs 65. Further, each of the return springs are insulated and the proximal end of the return springs are connected in some instances. Note for example in zero plate 43 that the proximal ends of return spring 62*p* are inter-connected between A and D, B and C, and E and F. On the interlock plate, however, the proximal ends 84*p* of the return springs 82 are inter-connected by leads 821 between dial openings A and B, D and E, and the dial opening C and F lead to the electrical probes 85A and 85B. Further, the shaft stop 2 in this modification is equipped with a shorting plate 88 as illustrated in FIG. 8, which acts as a switch member to connect the electrical contacts 67 and 87 as is shown in the wiring diagram of FIG. 9. Thus, when the shaft stop members 2 are in proper contact with the medially projecting stops 65 of the secondary stop member 66, an electrical circuit is completed thus closing the relay CR and allowing current to flow via lines 103 and 104 between power lines 100 and 101**, thus allowing the equipment activator mechanism M to activate the equipment. If on the other hand, proper contact is not made, the equipment will not start.

Figure 10:
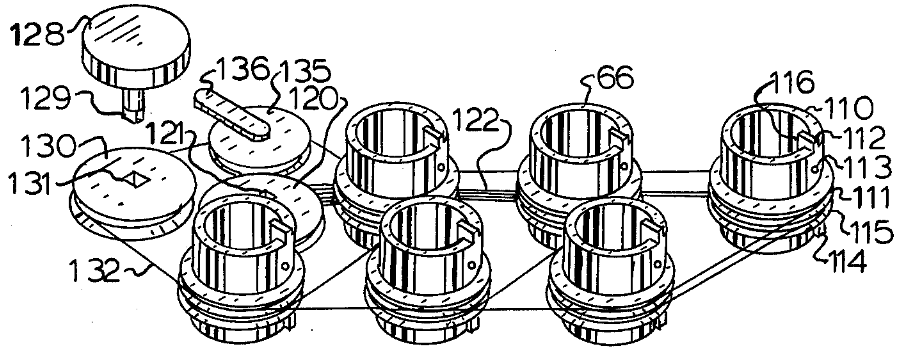
FIG. 10 is a perspective view of a fourth modification showing an additional or auxiliary drive member and tension drive spool for use with a modification of the rotatable dial stops previously illustrated in FIGS. 5 and 7.
Figure 11:
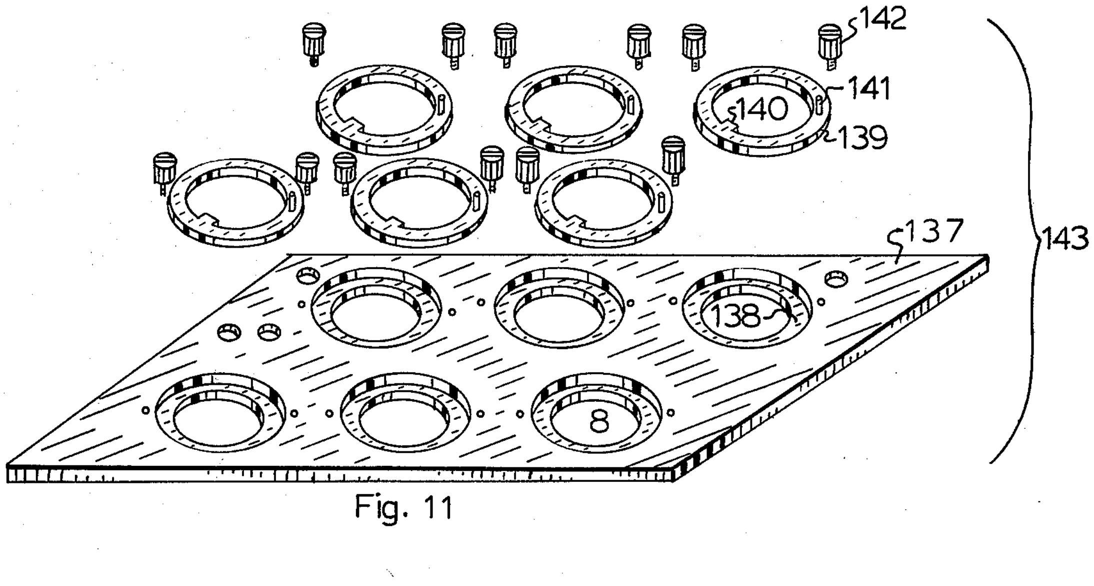
FIG. 11 illustrates an auxiliary lock plate for use with the rotatable auxiliary stop member and drive shown in FIG. 10, and illustrates the auxiliary stop member and the secondary stop screws utilized therewith for use with the auxiliary lock plate.

In some embodiments, it is necessary to set a series of dials, in which minimum shaft disturbance is required. It will be understood, of course, that some shafts will be set more closely to the limit side and some shafts more closely to the zero side of the excursion of the shaft. This is provided in FIG. 10. An auxiliary drive spool 130 driven by handle 128 of key 129 drives al of the rotatable members 66. Key 129 fits in socket 131. Sufficient tension is developed on cable 132 trained over tension spool 135 to rotate the shaft stops and shafts with the clutch engaged, but without sufficient force so as to prevent the shafts from slipping when the secondary lock is contacted. Spool 135 is controlled by lever 136. This assembly replaces the similar assembly of FIG. 5.

In this instance, the projecting shaft stops 112 are raised but act essentially as the projecting shaft stop 65. They are set in the identical manner as the secondary shaft stops 65, and then locked with the lock members 49 are previously indicated. Thereafter, however, a secondary or axialiary lock plate 137 is established over the rotatable stops, so that the projecting stop member 112 projects above the opening 8 of the auxiliary stop plate 137. In this instnce the area surrounding the opening 8 is recessed at 138 for provision of the auxiliary stop member which is manually moved by means of the stop knob 141 to engage with the upwardly projecting stop member 112. Thereafter, the auxilary stop ring 139 is anchored into position by means of auxiliary lock screws 142. This assembly replaces plate 6 of FIG. 5

Figure 4:
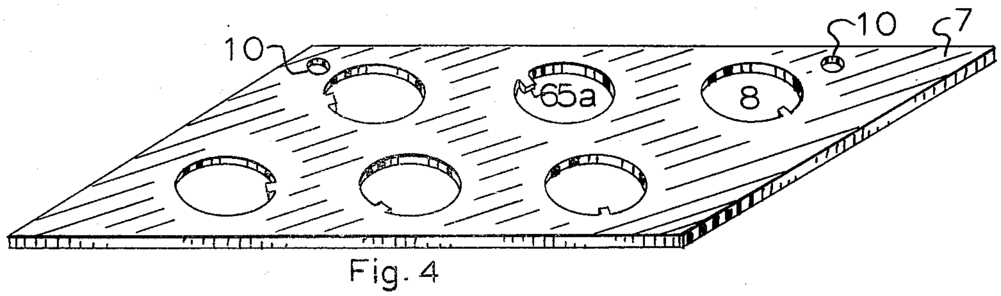
FIG. 4 is a view in perspective illustrating the secondary stop assembly in the form of a cast, punched or machined template.

Thereafter, the initial lock 49 is released by release of lock lever 63. Therefore, the rotatable collar 66 is again rotatable. The stop assembly 5, therefore, is moved to its limit position and placed on drive housing 13 with the clutch lugs 140 disengaged. The auxiliary driver 128 is rotated until all stops 112 contact and all of the shafts which were previously positioned toward the limit side of the excursion are brought to the desired positions. The clutches are then engaged and the drive assembly thereafter is moved toward the limit position and all shafts previously set toward the zero end of the excursion are brought to their desired position against the lugs 140 of auxiliary lock rings 139 locked into position by lock screws 142. This allows the correct setting of all the shafts with a minimum control disturbance. This plate assembly 143 allows for an adjustable template or a modification of that illustrated in FIG. 4 when used without rotatable collars of FIG. 10.

Many modifications will occur to those skilled in the art from the detailed description herein above given and such is meant to be exemplary in nature and non-limiting except so as to be commensurate in scope with the appended claims.

I claim:

1. In a control shaft group having a plurality of rotatable shafts, each shaft having a shaft stop member including a medially projecting lug, the combination with said rotatable shafts of a dial setting device for setting each rotatable shaft which comprises: a secondary stop assembly including a plate comprising;

1. an annular opening for registry with each of said control shafts;
2. a secondary stop member in each of said openings for engagement by the shaft stop member of the related control shaft upon the rotation of the shaft to establish a correct dial setting, and
3. positioning means for positioning said secondary stop assembly in registry with said control shaft group.

2. In a control shaft group as defined in claim 1, in which each secondary stop member of the said secondary stop assembly is a medial lug.

3. In a control shaft group as defined in claim 1, wherein each secondary stop member comprises:

A. a rotatable collar fitted for rotation in each of said anular openings of said plate and each collar includes a zero limit for establishing a zero position of said shaft stop member, B. the further combination therewith of means for locking said secondary stop member in a set position.

4. In a control shaft group as defined in claim 3, wherein the said secondary stop member has:

A. biasing means for returning the secondary stop member to said zero position.

5. In a control shaft group as defined in claim 3, the further combination therewith of drive means for turning the rotatable collars to a limit position.

6. In a control shaft group as defined in claim 1 including:

A. the further combination with each of said control shafts of driving means for turning each of said shafts simultaneously in either direction to a limit position that is reached when the shaft stop member engages the secondary stop member.

7. In a control shaft group as defined in claim 6 including:

A. the further combination with each of said control shaft driving means of slip clutch means which will turn said shaft positively in either direction but which will slip when a resisting force is applied to movement in either direction.

8. In a control shaft group as defined in claim 7 including:

A. the further combination therewith of a clutch release means for disengaging each of said driving means from said slip clutch means.

9. In a control shaft group as defined in claim 7, the further combination therewith of coupling means for coupling the driving means for each shaft to each other so as to simultaneously rotate all of said shafts over their full excursion in either direction until each of said shafts meets a resisting force.

10. In a control shaft group as defined in claim 8, including

A. the further combination therewith of a housing for enclosing said driving means, said slip clutch means and said coupling means together.

11. In a control shaft group as defined in claim 6, in which said driving means comprises A. a driving gear B. means for rotating said driving gear, C. a driven gear for each of said control shafts, and D. idler gears in meshed connection with said driving gear and said driven gears.

12. In a control shaft group as defined in claim 11, including the further combination therewith of a clutch release means comprising, A. means for depressing said idler gears and disengaging same from said driven gears.

13. In a control shaft group as defined in claim 12, in which

A. each of said idler gears are supported on a collar slidably positioned over a supporting shaft and a compression spring surrounding said supporting shaft; and B. said means for depressing said idler gears includes a cam eccentrically mounted on a shaft over each of said gears, C. means for actuating each of said cams comprising a cam actuating arm for each of said cams, and D. a tie rod, and a lever connected to said tie rod for actuating said cam arms so they operate in unison.

14. In a control shaft group as defined in claim 7, in which said slip clutch comprises A. a clutch plate in bearing engagement with the driving means for each shaft.

B. biasing means for application of pressure on each clutch plate, and

C. adjustment means for adjusting the amount of pressure applied to each of said clutch plates.

15. In a control shaft group as defined in claim 1, wherein:

A. said secondary stop assembly comprises a plurality of superimposed plates in fixed and in spaced relation to each other and including a plurality of annular openings in vertical registry, and B. in which each of said secondary stop members is adjustable and comprising 1. a rotatable collar fitted for rotation in an associated annular opening and including
   a. a radially projecting limit stop, and
   b. a medially projecting lug C. spring means for attachment to each of said rotatable collars for biasing said collars towards a zero position defined by stops formed on the apertures of one of said plates and said radially extending limit stops and D. locking means for locking said rotatable collars in position and for releasing said collars.

16. In a control shaft group as defined in claim 15, wherein said secondary stop assembly includes:

A. a lock plate, comprising 1. a locking member adjacent to each of said annular openings and including
   a. crescent-shaped lock ring anchored at one end to said lock plate
   b. a lock release coupling member attached at the other end of said lock ring for application of pressure to open said lock ring
   c. a lock release rod connecting a plurality of said lock release couplings together, and
   d. lever means to open said crescent-shaped lock rings.

17. In a control shaft group as defined in claim 16, wherein said means for applying pressure includes A. a tie rod connected to said lock release rod B. a cam, eccentrically mounted on said lock plate in camming relation to said tie rod, and C. means for turning said cam member to exert pressure on said tie rod.

18. In a control shaft group as defined in claim 16, in which said lock release coupling member includes:

A. collar member fitted over said lock release rod

B. connection means for connecting the collar member to the distal end of said crescent-shaped spring lock ring, and C. a nut threadably engaged on said lock release rod for adjustment of the tension on said lock release coupling member.

19. In a control shaft group as defined in claim 16, the further combination with said lock ring of A. adjustment means for adjusting the spring tension of said lock ring.

20. In a control shaft group as defined in claim 19, wherein said adjustment means comprises a cam mounted on said lock plate in camming relation with the intermediate portion of said crescent-shaped lock ring.

21. In a control shaft group as defined in claim 15, wherein the zero return spring means of the secondary stop assembly surrounds each of said annular openings and includes a. a spring coupling at the distal end of said spring means for attachment to said rotatable collar member, and b. a spring anchoring means at the proximal end of said spring means in fixed position on a zero return plate.

22. In a control shaft group as defined in claim 21, the combination therewith of A. an equipment activator mechanism and an electrical control circuit interconnected therewith for determining the correct position of each of said secondary stop members, and B. a zero return plate including 1. insulated zero return springs each having one end anchored at its proximal end to said plate and its other end terminating as an electrical contact in said medially projecting lug of said secondary stop member, 2. electrically conductive leads inter-connecting certain proximal ends of said return springs C. an interlock plate including 1. insulated zero return springs each anchored at its proximal end to said plate and at its distal end to the rotatable collar and terminating as an electrical contact in said medially projecting lug, and 2. electrical leads inter-connecting certain proximal ends of said zero return springs to form an incomplete circuit D. an electrical probe means connecting said incompleted circuits from said interlock plate and said electrical control circuit E. an electrically conductive shorting plate on each of said radially projecting shaft stops to bridge the two electrical contacts on each of said medially projecting lugs of said rotatable collars upon proper contact of said shaft stop with said secondary stop, F. an electrical relay inter-connected in said circuit to complete the circuit so as to activate the equipment activator mechanism, and G. power means for said electrical circuit.

23. A dial setting device as defined in claim 15, the improvement wherein said secondary stop assembly includes A. a limit plate including 1. a medially projecting lug in each of said annular openings for engagement with the limit stop of the associated rotatable collar.

24. In a control shaft group as defined in claim 15, the further combination therewith of A. a drive means for driving each of said rotatable collars including 1. a limit drive spool journaled in said assembly, and 2. a cable for each of said rotatable collars carried on said drive spool B. a spool on each of said rotatable collars for attachment to its separate cable C. means for turning said limit drive spool.

25. In a control shaft group as defined in claim 24, the further combination therewith of A. an auxiliary cable drive means for driving all of said rotatable collars, and B. a tension member for adjusting the tension on said auxiliary cable drive means, and C. an auxiliary stop ring for each aperture, containing a medially projecting lug, and, D. an auxiliary locking system for locking said auxiliary stop rings into position.

26. In a control shaft group as defined in claim 25, in which said auxiliary locking system comprises A. a stop lock plate containing a recessed area around each annular opening B. a stop ring containing a medially projecting lug and fitting into said recessed area C. locking screws for locking said locking rings in position.

27. The process of establishing a set of dial settings from a group of control shafts in which each of said control shafts is equipped with a shaft stop including a radially extending lug, the steps which comprise A. turning each of a correspondingly positioned set of rotatable stops to a set limit against the biasing pressure of a spring member and locking each in locked position, B. registering each of said rotatable stops over its corresponding control shaft, and C. unlocking said rotatable stops and allowing each of said rotatable stops to rotate responsive to said biasing pressure until contact is made with the lug of its corresponding shaft stop and D. locking each of said rotatable stops into position to establish the dial setting of the set.

28. The process of transferring a set of dial settings to a group of control shafts, in which each of said shafts has a shaft stop in the form of a radially extending lug, which comprises the steps of:

A. setting each of the control shafts at zero setting

B. placing a set of apertures having preset medially extending dial stops over said group of control shafts C. turning each of said control shafts counterclockwise until each of said radially extending lugs comes into contact with its respective medially extending dial stop.

* * * * *